United States Patent Office 3,681,010
Patented Aug. 1, 1972

3,681,010
PREPARATION OF ULTRAFINE MIXED METALLIC-OXIDE POWDERS
Donald R. Messier, Marblehead, and George E. Gazza, Sudbury, Mass., assignors to the United States of America as represented by the Secretary of the Army
No Drawing. Filed Sept. 14, 1970, Ser. No. 72,224
Int. Cl. C22b 59/00
U.S. Cl. 23—20      4 Claims

ABSTRACT OF THE DISCLOSURE

A method for the preparation of ultrafine mixed metallic-oxide powders comprising the steps of: comelting stoichiometric amounts of hydrated nitrates of at least two cations, freezing the melt to produce an intimate mixture of the solid hydrated nitrates, partially dehydrating the solid mixture at a subliquidus temperatures and heating the dehydrated mixture in order to drive off the nitrogen and decompose the mixture to the oxide.

---

The invention described herein may be manufactured, used, and licensed by or for the Government for governmental purposes without the payment to us of any royalty thereon.

This invention relates an an improved method for the preparation of ultrafine mixed metallic-oxide powders utilized as starting materials in ceramic fabrication processes.

In certain ceramic fabrication processes such as, for example, pressure sintering and preparation of single crystals by zone refining, it is advantageous to utilize an ultrafine material so that the process can be carried out at lower temperatures. A prior art method used to synthesize ultrafine stoichiometric mixed metallic-oxide powders involves the mechanical mixing of powders of the component oxides followed by heat treatment to form the compounds through a solid state diffusion mechanism. In distinction therefrom, the comelting and freezing of the present metallic hydrated nitrates in stoichiometric amounts produces an intimate mixture of the hydrated nitrates wherein the diffusion distances between the atoms is very small. This is conductive to the formation of the desired powders at lower temperature in comparison wtih the above prior art method. Other prior art processes such as, e.g., coprecipitation, freeze drying and crystallization require more elaborate equipment and controls is comparison with the present method.

It is an object of the persent invention to provide and disclose an improved method for the production of ultrafine mixed metallic-oxide powders utilizing hydrated nitrate precursors.

It is a further object of the invention to provide and disclose a simple and convenient method for the production of ultrafine mixed metallic-oxide powders utilizing hydrated nitrate precursors.

It is a further object of this invention to provide and disclose an improved method for the production of ultrafine mixed metallic-oxide powders utilizing comparatively low calcination temperatures.

Other objects and a fuller understanding of the invention may be ascertained by referring to the following description and claims.

Magnesium-aluminum spinel ($MgAl_2O_4$) and yttrium-aluminum garnet ($Y_3Al_5O_{12}$) were prepared in accordance with the procedure set forth below in Examples I and II, respectively.

Example I 204.8 grams of $Al(NO_3)_3 \cdot 9H_2O$ (0.546 moles) and 70 grams of $Mg(NO_3)_3 \cdot 6H_2O$ (0.274 moles) were loaded into a Pyrex beaker and heated on a hot plate at a temperature of around 180° C. for a period of time sufficient to form a low viscosity melt. The melt was subjected to stirring in order to promote solution and mixing of the components. The melt was then poured into a shallow Pyrex dish and allowed to cool to room temperature. The cooled solid was subsequently partially dehydrated by heating in a vacuum dryer at a temperature of 60 to 90° C. for a period of about 24 hours under a vacuum of about 1 torr. The partially dehydrated nitrate was decomposed by heating under a vacuum of about 1 torr at a temperature of around 400° C. for a period of one hour. The material may also be decomposed in the presence of air. 35 grams of a product were recovered representing 90% of theoretical.

Example II

The process of Example I was repeated utilizing 130.6 grams of $Al(NO_3)_3 \cdot 9H_2O$ (0.348 moles) and 80.0 grams of $Y(NO_3)_3 \cdot 6H_2O$ (0.209 moles). 37.2 grams of yttrium-aluminum garnet representing a yield of 90% of theoretical, was recovered.

While we have specifically illustrated the preparation of magnesium-aluminum spinel and yttrium-aluminum garnet, it is considered that the present process may be utilized to produce any mixed metallic-oxide powder from low melting hydrated nitrate precursors, i.e., having a melting point temperature of less than 200° C. Other examples of produced compounds include, but are not restricted to, $LiAl_5O_8$, $YAlO_3$, $YAl_4O_9$ and $Y_3Fe_5O_{12}$. Hydrated nitrate precursors, in addition to those previously mentioned, include $LiNO_3 \cdot 3H_2O$ and

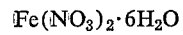

$$Fe(NO_3)_2 \cdot 6H_2O$$

The resultant products were crystallized by calcination at 800–900° C. in order to obtain a powder suitable for X-ray analysis used thereby to confirm the success of the process. Powder patterns were obtained with an X-ray diffractometer using Cu Kα radiation at a voltage of 35 kv. and a current of 20 ma. The range covered was from 8 to 80 degrees at a rate of 2 degrees per minute. Successful processing resulted in patterns showing only diffraction peaks corresponding to the desired compounds, i.e., magnesium-aluminum spinel or yttrium-aluminum garnet. Substantial deviations from the described procedure invariably yielded powders giving X-ray peaks corresponding to undesired extra phases. In the case of spinel, the extra phases were magnesium and aluminum oxide. In the case of garnet, the extra phases were identified as perovskite ($YAlO_3$) and $Y_2Al_4O_9$.

A precaution that is vital to the success of the process is avoiding the presence of excess moisture in the starting hydrated nitrate salts. This moisture is detrimental in that it changes the molecular weight of the salt and thus changes the stoichiometry of the product obtained. In addition, excess moisture changes the crystallization behavior of the melt and causes phase separation in the product. For example, the product contains $Al_2O_3$ and MgO in addition to magnesium-aluminum spinel. Phase separation also results when the nitrates are not partially dehydrated prior to decomposition.

An advantage of the present process lies in its simplicity. No elaborate apparatus is required. In addition, the anions are easily removed from the precursor salts. This is in contrast with oxides prepared from chlorides and sulfates which require higher temperatures for decomposition.

Although we have described our invention with a certain degree of particularity, we wish it to be understood that we do not desire to be limited to the exact materials and method of preparation shown and described, for obvious modifications will occur to a person skilled in the art.

Having described our invention, we claim:

1. A method for the preparation of ultrafine mixed metallic-oxide powders selected from the group consisting of $MgAl_2O_4$, $Y_3Al_5O_{12}$, $LiAl_5O_8$, $YAlO_9$ and $Y_3Fe_5O_{12}$, comprising the steps of:

selecting hydrated nitrates of at least 2 cations having a melting point of less than 200° C., comelting the selected nitrates, cooling to solidify the melt in order to produce an intimate mixture of the solid hydrated nitrates, partially dehydrating the mixture by heating at a subliquidus temperature under a vacuum of about 1 torr and, heating the partially dehydrated mixture under a vacuum of about 1 torr to a temperature sufficient to decompose it to an oxide.

2. A process in accordance with claim 1 wherein the partially dehydrated mixture is decomposed to the oxide at a temperature of around 400° C. for a period of about 1 hour.

3. A process in accordance with claim 1 wherein the ultrafine mixed metallic-oxide powder is $MgAl_2O_4$.

4. A process in accordance with claim 1 wherein the ultrafine mixed metallic-oxide powder is $Y_3Al_5O_{12}$.

References Cited

UNITED STATES PATENTS

| | | | |
|---|---|---|---|
| 3,378,335 | 4/1968 | Ellis et al. | 23—51 R |
| 3,509,057 | 4/1970 | Greger | 23—51 R X |
| 3,516,935 | 6/1970 | Monforte et al. | 23—51 R X |
| 3,305,349 | 2/1967 | Bovarnick et al. | 23—51 R UX |
| 3,542,571 | 11/1970 | Smith | 23—51 R X |

HERBERT T. CARTER, Primary Examiner

U.S. Cl. X.R.

23—51 R, 52